United States Patent
Courtright et al.

(10) Patent No.: US 11,216,822 B1
(45) Date of Patent: *Jan. 4, 2022

(54) SYSTEMS AND METHODS FOR USER AUTHENTICATION VIA MOBILE DEVICE

(71) Applicant: United Services Automobile Association (USAA), San Antonio, TX (US)

(72) Inventors: Christopher Paul Courtright, San Antonio, TX (US); Bradly Jay Billman, Pocatello, ID (US)

(73) Assignee: United Services Automobile Association (USAA), San Antonio, TX (US)

( * ) Notice: Subject to any disclaimer, the term of this patent is extended or adjusted under 35 U.S.C. 154(b) by 226 days.

This patent is subject to a terminal disclaimer.

(21) Appl. No.: 16/584,381

(22) Filed: Sep. 26, 2019

Related U.S. Application Data

(63) Continuation of application No. 14/925,783, filed on Oct. 28, 2015, now Pat. No. 10,467,628, which is a
(Continued)

(51) Int. Cl.
| | |
|---|---|
| *G06Q 20/40* | (2012.01) |
| *G06F 3/01* | (2006.01) |
| *G06Q 20/20* | (2012.01) |
| *G06Q 20/32* | (2012.01) |
| *G06Q 20/10* | (2012.01) |

(Continued)

(52) U.S. Cl.
CPC ........... *G06Q 20/409* (2013.01); *G06F 3/017* (2013.01); *G06F 3/04842* (2013.01); *G06K 9/6201* (2013.01); *G06Q 20/1085* (2013.01); *G06Q 20/202* (2013.01); *G06Q 20/3274* (2013.01); *G06T 11/60* (2013.01)

(58) Field of Classification Search
CPC ............. G06Q 20/409; G06Q 20/1085; G06Q 20/202; G06Q 20/3274; G06F 3/017; G06F 3/04842; G06K 9/6201; G06T 11/60
USPC ........................................................ 705/64
See application file for complete search history.

(56) References Cited

U.S. PATENT DOCUMENTS

| | | |
|---|---|---|
| 6,308,887 B1 | 10/2001 | Korman et al. |
| 6,421,453 B1 | 7/2002 | Kanevsky et al. |
| | (Continued) | |

OTHER PUBLICATIONS

U.S. Appl. No. 14/925,783, filed Oct. 28, 2015, Courtright et al.
(Continued)

*Primary Examiner* — James D Nigh
(74) *Attorney, Agent, or Firm* — Fish & Richardson P.C.

(57) ABSTRACT

A user may provide a financial card to an automated teller machine (ATM) or point of sale (POS) terminal and may be authenticated by providing a gesture and/or an image selection via a mobile device to the ATM or the POS. The gesture and/or image selection may be provided using a touchscreen of the mobile device. The gesture and/or image provided by the user via the mobile device may be compared to a stored gesture and/or image provided by the user during an earlier registration of the financial card. If there is a match between the gesture and/or image provided by the user via the mobile device and the previously stored gesture and/or image, then the user is authenticated and may access an account associated with the financial card.

20 Claims, 8 Drawing Sheets

Related U.S. Application Data continuation of application No. 12/427,031, filed on Apr. 21, 2009, now Pat. No. 9,183,554.

(51) Int. Cl.
*G06F 3/0484* (2013.01)
*G06K 9/62* (2006.01)
*G06T 11/60* (2006.01)

(56) References Cited

U.S. PATENT DOCUMENTS

| | | | |
|---|---|---|---|
| 6,934,860 B1 * | 8/2005 | Goldstein | G06F 21/36 713/183 |
| 7,715,600 B2 | 5/2010 | Avni et al. | |
| 8,392,975 B1 | 3/2013 | Raghunath | |
| 9,183,554 B1 | 11/2015 | Courtright et al. | |
| 2002/0135618 A1 * | 9/2002 | Maes | G06K 9/00248 715/767 |
| 2003/0132974 A1 * | 7/2003 | Bodin | G06F 3/017 715/863 |
| 2003/0163708 A1 * | 8/2003 | Tang | G07C 9/37 713/185 |
| 2004/0135801 A1 | 7/2004 | Thompson et al. | |
| 2005/0131824 A1 | 6/2005 | Drummond et al. | |
| 2005/0137960 A1 * | 6/2005 | Brann | G06Q 40/04 705/37 |
| 2006/0136846 A1 | 6/2006 | Im et al. | |
| 2006/0255128 A1 | 11/2006 | Johnson et al. | |
| 2007/0074273 A1 | 3/2007 | Linden | |
| 2008/0082452 A1 | 4/2008 | Wankmueller et al. | |
| 2008/0113791 A1 * | 5/2008 | Williams | G06F 21/31 463/29 |
| 2008/0126260 A1 | 5/2008 | Cox et al. | |
| 2008/0230598 A1 | 9/2008 | Bodin | |
| 2009/0083850 A1 | 3/2009 | Fadell et al. | |
| 2009/0262069 A1 | 10/2009 | Huntington | |
| 2009/0284482 A1 | 11/2009 | Chin | |
| 2010/0082490 A1 * | 4/2010 | Rosenblatt | G06Q 20/382 705/64 |
| 2010/0093429 A1 | 4/2010 | Mattice et al. | |
| 2010/0225443 A1 * | 9/2010 | Bayram | H04W 12/068 340/5.83 |

OTHER PUBLICATIONS

Claycomb, William R., et al. "Secure Real World Interaction Using Mobile Devices," Department of Computer Science, 11 pages, 2006.

Kent, Craig Lloyd, "Smart Cards as an Electronic Medium of Payment for Banking Systems," 11 pages, 2003.

USPTO Transaction History for U.S. Appl. No. 12/427,031, filed Apr. 21, 2009, 282 pages.

USPTO Transaction History for U.S. Appl. No. 14/925,783, filed Oct. 28, 2015, 212 pages.

* cited by examiner

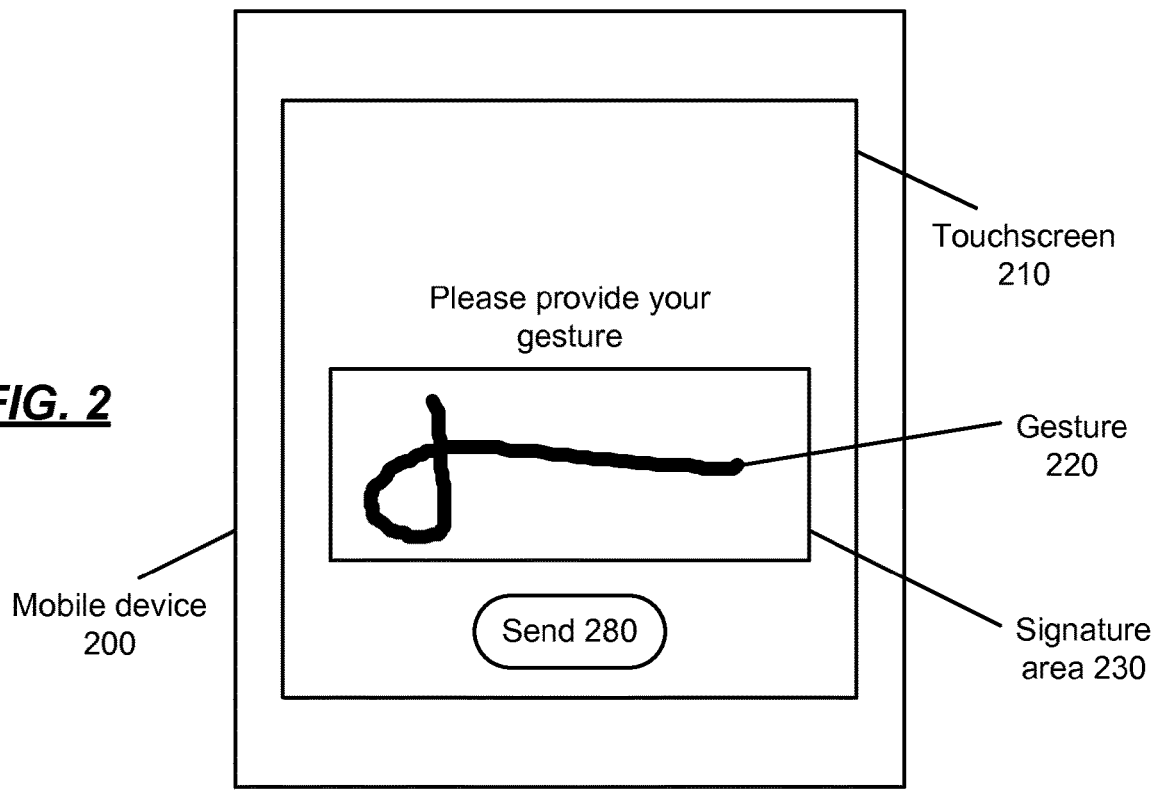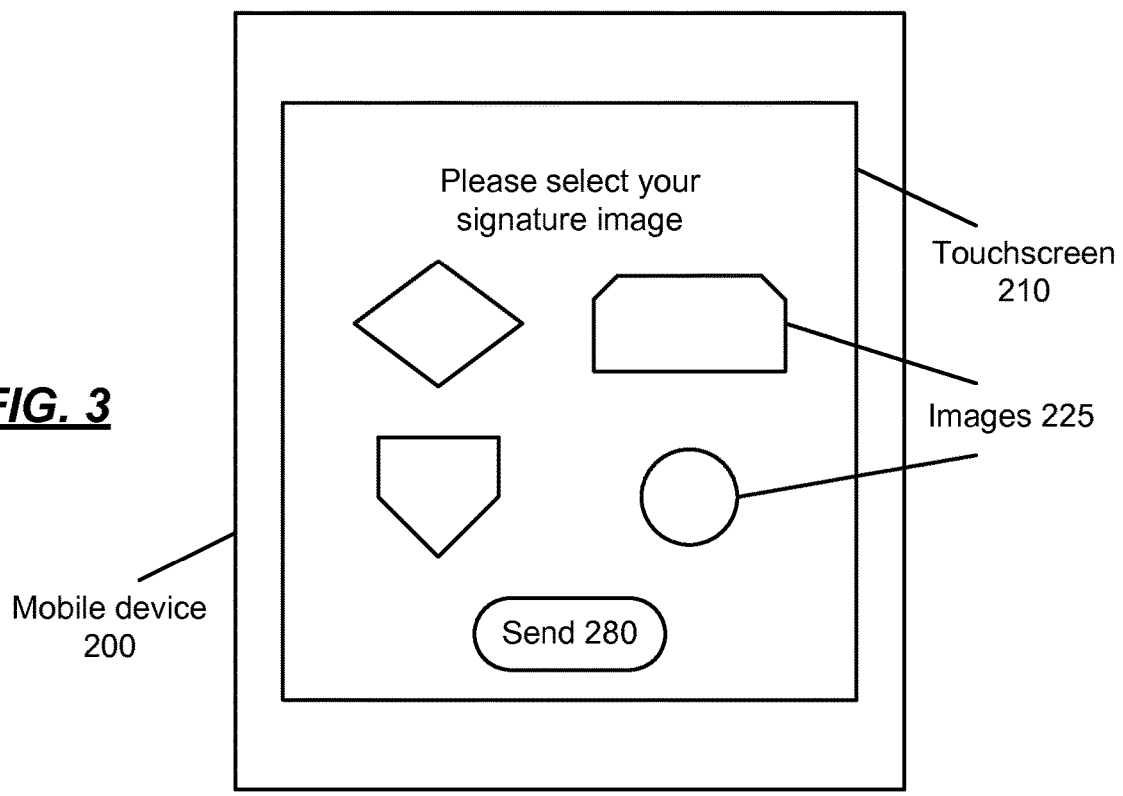

SYSTEMS AND METHODS FOR USER AUTHENTICATION VIA MOBILE DEVICE

CROSS-REFERENCE TO RELATED APPLICATIONS

This application is a continuation application of and claims priority under 35 U.S.C. § 120 to U.S. application Ser. No. 14/925,783, filed on Oct. 28, 2015, which in turn is a continuation application of and claims priority under 35 U.S.C. § 120 to U.S. application Ser. No. 12/427,031, filed on Apr. 21, 2009, now U.S. Pat. No. 9,183,554, the entire contents of each of which are incorporated herein by reference.

BACKGROUND

An automated teller machine (ATM) is a computerized telecommunications device that provides a user with access to financial transactions in a public space without the need for a human clerk or bank teller. An ATM may be placed anywhere, such as, for example, near or inside the premises of a bank or in a location such as a shopping center, an airport, a grocery store, a gas station, a restaurant, or any place people may gather. Using an ATM, users can access their bank accounts in order to make cash withdrawals (or credit card cash advances) and check their account balances, for example.

Typically, the user is identified at an ATM by inserting a financial card, such as an ATM card, a credit card, or a debit card, into the ATM. The financial card may be a plastic card with a magnetic stripe or a plastic smartcard with a chip and contains a unique card number and information such as an expiration date and/or a card security code (also known as a card verification value). Authentication of the user is provided by the user entering a personal identification number (PIN) into a keypad of the ATM.

There are incidents of fraud where perpetrators attach fake keypads or card readers to existing ATMs and well as other point of sale (POS) terminals. Cameras are often deployed in conjunction with the fake keypads and card readers. These "skimming" devices are used to record users' PINs and financial card information in order to gain unauthorized access to the users' accounts.

SUMMARY

A user may provide a financial card to an automated teller machine (ATM) or point of sale (POS) terminal and may be authenticated by providing a gesture via a mobile device to the ATM or the POS. The gesture may be provided using a touchscreen of the mobile device. The gesture provided by the user via the mobile device may be compared to a stored gesture provided by the user during an earlier registration of the financial card. If there is a match between the gesture provided by the user via the mobile device and the previously stored gesture, then the user is authenticated and may access an account associated with the financial card.

In an implementation, the user may select an image via the mobile device and the selected image may be used in conjunction with a gesture to authenticate the user at the ATM or the POS.

In an implementation, the user may provide a gesture and/or an image via the mobile device in order to be authenticated to perform a particular transaction with the ATM or the POS.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIG. 2 is a diagram of an example gesture that may be useful in describing an implementation of providing user authentication via a mobile device;

FIG. 3 is a diagram of an example of images that may be useful in describing an implementation of providing user authentication via a mobile device;

DETAILED DESCRIPTION

Figure 1:
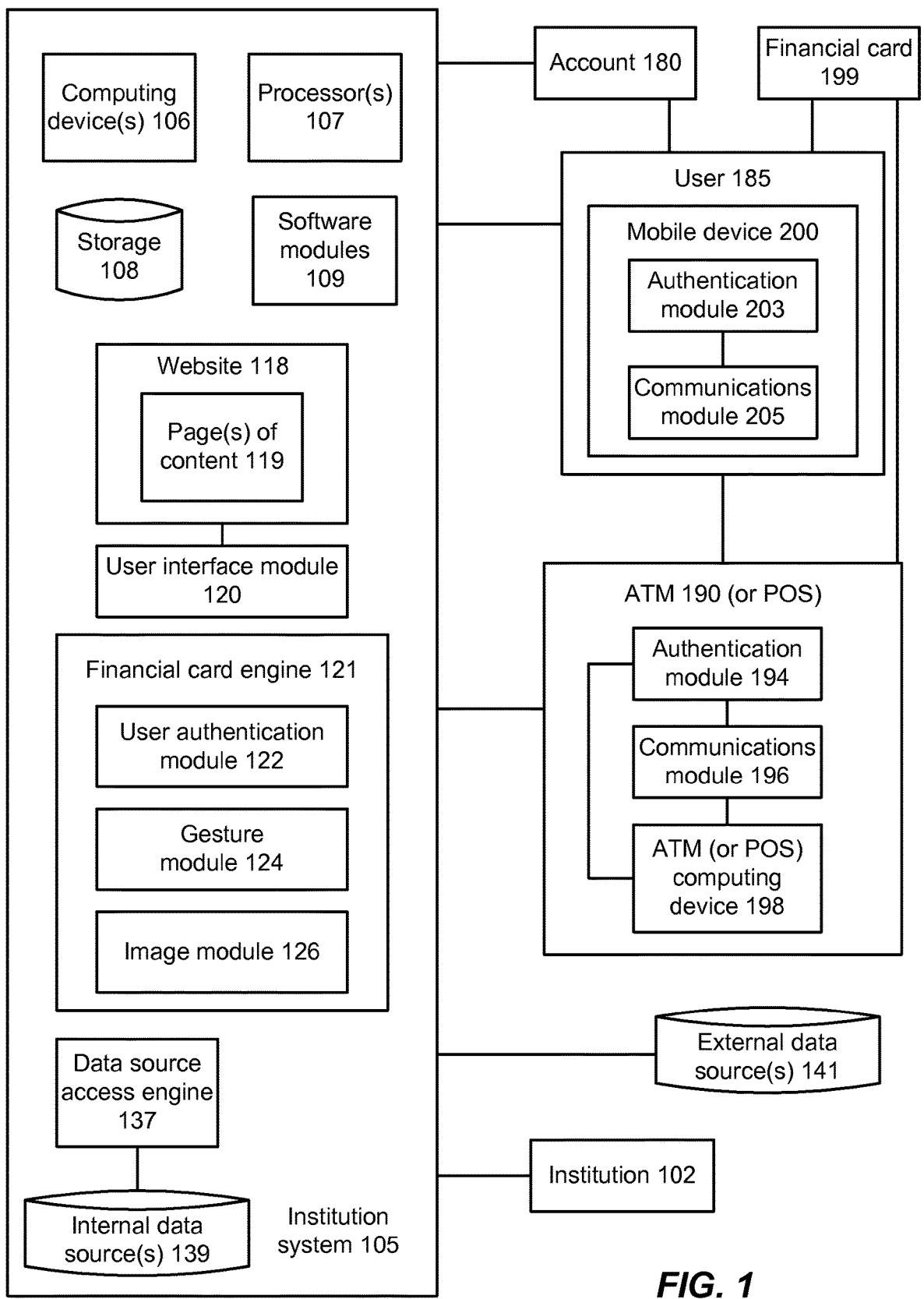
FIG. 1 is a block diagram of an implementation of a system that may be used in conjunction with providing user authentication via a mobile device.

FIG. 1 is a block diagram of an implementation of a system that may be used in conjunction with providing user authentication via a mobile device 200. An institution system 105 may be affiliated with an institution 102 which may be any type of entity capable of providing financial services, such as issuing financial cards, maintaining accounts involving financial cards, and/or processing transactions involving financial cards or associated accounts. For example, the institution 102 may be any type of financial services company, bank, etc. A financial card 199 may be any type of card that may be used at an automated teller machine (ATM) 190 or a point of sale (POS) (may also be referred to herein as "ATM/POS"), such as a credit card, a charge card, a debit card, or an ATM card, for example. The financial card 199 may be issued by the institution 102 or another entity. In an implementation, the ATM 190 may be associated or affiliated with the institution 102.

A user 185 and an associated mobile device 200 are shown. In an implementation, the user 185 may be an individual who owns an account 180 that is held by the institution 102 and accessible via the institution system 105. The account 180 may be any type of account that may be associated with a financial card, such as a credit card account, a charge card account, or an account for depositing funds and from which funds may be withdrawn, such as a savings account, a checking account, a brokerage account, and the like.

The mobile device 200 may be any type of computing device such as a personal digital assistant (PDA), a mobile phone, a smart phone, a handheld computing device, and the like. In an implementation, the mobile device 200 is a pocket-sized computing device, having a display screen with touch input via a touchscreen interface. A touchscreen is a display which can detect the presence and location of a touch within the display area. The term generally refers to touch or contact to the display of the device by a finger or hand. Touchscreens can also sense other passive objects, such as a stylus. The ability to interact directly with a display typically indicates the presence of a touchscreen. A miniature keyboard may be provided as part of the mobile device 200. The mobile device 200 has wireless capability to connect to the Internet and other computer systems via various communications networks. A possible configuration of a mobile device, such as the mobile device 200, is described with respect to FIG. 9.

The ATM 190 is a computerized telecommunications device that provides the user 185 (as well as other customers of the institution 102 or other users, for example) with access to financial transactions in a public space without the need for a human clerk or bank teller. The ATM 190 may have a sign indicating the name of the bank or institution owning, operating, or otherwise affiliated with, the ATM 190.

Although ATMs were originally developed as just cash dispensers, they have evolved to include many other bank related and non-bank related functions. ATMs include many functions such as providing deposit currency recognition and acceptance, facilitating payment of routine bills, fees, and taxes, printing bank statements, loading monetary value into stored value cards, selling items such as postage stamps, lottery tickets, train tickets, concert tickets, shopping mall gift certificates, etc., providing games and promotional features, providing check processing, etc.

In an implementation, a point of sale may be used instead of the ATM 190 as described further herein. A POS can be a location where a transaction occurs, such as a retail shop, a checkout counter in a shop, etc. Point of sale systems are used in supermarkets, restaurants, hotels, stadiums, and casinos, as well as almost any type of retail establishment. Point of sale systems use a POS terminal which may be considered a form of electronic cash register. A POS terminal is a device that can do transactions with a financial card, such as a credit card, a charge card, or a debit card, for example. Although examples herein may be described with respect to an ATM, it is contemplated that the techniques and operations described herein may be applied to POS systems and terminals.

In an implementation, the user 185 may visit the ATM 190 and provide information from the financial card 199 to the ATM 190 (e.g., by swiping the financial card 199 at the ATM 190 or by transmitting information such as user name, card number, expiration date, security code, etc. from the mobile device 200 to the ATM 190). The user 185 may be authenticated by providing a gesture and/or an image selection via the mobile device 200 to the ATM 190, as described further herein. A gesture, as the term is used herein, is a type of written communication made with a finger or stylus or other input device on a touchscreen or display of a computing device, such as the mobile device 200, for example. The gesture may represent any symbol. The gesture may be freeform or traced (e.g., the user 185 may trace a gesture over characters or images provided in a display of the mobile device 200). In an implementation, the user may fingerswipe a predetermined pattern or symbol or trace a pattern or path on the touchscreen of the mobile device 200.

The gesture and/or image selection provided by the user 185 via the mobile device 200 may be compared to a previously stored gesture and/or image provided by the user 185 during an earlier registration of the financial card 199 with the institution system 105. If there is a match between the gesture and/or image provided by the user 185 via the mobile device 200 and the previously stored gesture and/or image, then the user is authenticated and may access an account associated with the financial card. In an implementation, the user 185 may authenticate via the mobile device 200 in order to perform particular transactions with the ATM 190.

The ATM 190 may perform the authentication of the user alone or in conjunction with the institution system 105. The ATM 190 may communicate over a communications network with the institution system 105 to perform the authentication processing. In an implementation, the communication may be performed through an ISO 8583 messaging system, though any communication technique(s) may be used. In addition to techniques employed for transaction security and secrecy, the communications traffic between the ATM 190 and the institution system 105 may also be encrypted via methods such as secure sockets layer (SSL) or transport layer security (TLS). The ATM 190 and the institution system 105 may also communicate to tie the financial card 199 to an account of the user 185.

The ATM 190 may connect to the institution system 105 via a dial-up modem over a telephone line, directly via a leased line, or via an Internet connection. Common lower-level layer communication protocols that may be used by the ATM 190 to communicate with the institution system 105 include SNA (systems network architecture) over SDLC (synchronous data link control), X.25, and TCP/IP over Ethernet, for example.

Sensitive data in ATM transactions may be encrypted with data encryption standard (DES) or triple DES. Remote key loading techniques may be used to ensure the secrecy of the initialization of the encryption keys in the ATM 190. Message authentication code (MAC) or partial MAC may also be used to ensure messages have not been tampered with while in transit between the ATM 190 and the institution system 105.

The ATM 190 may comprise a central processing unit (CPU) to control the user interface and transaction devices, a magnetic and/or chip card reader to identify the user 185, a personal identification number (PIN) pad, a secure cryptoprocessor (a dedicated computer or microprocessor for carrying out cryptographic operations, embedded in a packaging with multiple physical security measures, which provides tamper resistance), a display that may used by the user 185 for performing some aspects of a transaction in an implementation, function key buttons or a touchscreen that may be used to select the various aspects of the transaction, and a record printer to provide the user 185 with a record of their transaction. Such components may be comprised within the ATM computing device 198 shown in FIG. 1. An example computing device is described with respect to FIG. 8. The ATM 190 may also comprise a vault to store the parts of the machinery having restricted access, and a housing for aesthetics and to attach signage to. Such components are well known and not shown in FIG. 1.

Recently, due to heavier computing demands and the falling price of computer-like architectures, ATMs have moved away from custom hardware architectures using microcontrollers and/or application specific integrated circuits to adopting a hardware architecture that is very similar to a personal computer (PC). Many ATMs are now able to use operating systems such as Microsoft Windows and Linux. With the migration to commodity PC hardware, standard commercial off-the-shelf operating systems and programming environments can be used inside of ATMs. Typical platforms used in ATM development include RMX, OS/2, and Microsoft operating systems. Java, Linux, and Unix may also be used in these environments.

The ATM 190 may comprise a communications module 196 that is adapted to communicate with the mobile device 200, e.g., via a communications module 205 of the mobile device 200. The ATM 190 may comprise an authentication module 194 that is adapted to perform the authentication of the user 185 (e.g., alone or in conjunction with the institution system 105). The authentication module 194 may prompt the user 185 for authentication information (e.g., a gesture and/or an image selection) via an authentication module 203 of the mobile device 200. In response, the user 185 may provide a gesture and/or an image selection through a touchscreen of the mobile device 200. The ATM 190 receives the gesture and/or the image selection from the mobile device 200 and performs the authentication using techniques and operations described herein.

The institution system 105 may include a user interface module 120, a financial card engine 121, and a data source access engine 137. The user interface module 120 may generate and format one or more pages of content 119 as a unified graphical presentation that may be provided to the mobile device 200, or another user computing device such as a PC or any other computing device, as an output from the financial card engine 121. In an implementation, the page(s) of content 119 may be provided to the mobile device 200 via a secure website 118 associated with the institution system 105. On the website 118, the user 185 may be presented with information pertaining to the account 180, the financial card 199, and/or gesture and image information for the financial card 199 such as registration of one or more gestures and/or images for the financial card 199, as described further herein.

The user 185 may communicate with the institution system 105 by way of a communications network such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 185 may also communicate with the institution system 105 by phone, email, instant messaging, test messaging, web chat, facsimile, mail, and the like.

The financial card engine 121 may register one or more gestures and/or images of a user 185 pertaining to the financial card 199 and may perform authentication of the user 185 using the gesture(s) and/or the image(s). In an implementation, a user authentication module 122 may obtain data from internal data source(s) 139 and/or external data source(s) 141 by the data source access engine 137 that may be used in the authentication of the user 185 of the financial card 199. The data may include previously stored gestures and/or images registered by the user 185 with respect to the financial card 199. Data may also be requested and received from the user 185 (e.g., via the ATM 190 and/or the mobile device 200). Such data may also be used in authenticating the user 185.

The user 185 may register one or more gestures for use with the financial card 199 with a gesture module 124 of the financial card engine 121. After the user 185 has received and activated the financial card 199, the user may access the institution system 105 (e.g., via the website 118) and provide one or more gestures (e.g., via a touchscreen of the mobile device 200) that are to be associated with the financial card 199. Gestures are described further with respect to FIG. 2, for example.

In an implementation, a gesture may be registered that is to subsequently be used in the authentication of the user to access an account that is tied to the financial card 199. In an implementation, multiple gestures may be registered, where each gesture may be associated with a particular transaction that may be performed at the ATM 190 or POS with respect to the financial card 199 (e.g., transfer of funds, withdrawal of funds, a purchase over a certain amount, etc.). Gestures that are provided by the user 185 may be stored in storage of the institution system 105, such as internal data source(s) 139 or storage 108. The gesture(s) may be stored in a database in an entry associated with the user 185, the financial card 199, or an account of the user 185, for example.

The user 185 may register one or more images for use with the financial card 199 with an image module 126 of the financial card engine 121. As with registering gestures, after the user 185 has received and activated the financial card 199, the user 185 may access the institution system 105 (e.g., via the website 118) and select one or more images (e.g., provided by the institution to the user 185 via a display or touchscreen of the mobile device 200) that are to be associated with the financial card 199. The images that are presented for selection by the user 185 may be retrieved from storage, such as internal data source(s) 139, external data source(s) 141, or storage 108, for example. Images that are selected by the user 185 may be stored in storage of the institution system 105, such as internal data source(s) 139 or storage 108. The image(s) may be stored in a database in an entry associated with the user 185, the financial card 199, or an account of the user 185, for example. Images are described further with respect to FIG. 3, for example.

An image may provide an additional level of security to the authentication of the user 185 when using the financial card 199 at the ATM 190 or POS. When authenticating, the user 185 may be presented with multiple images and may select the previously registered image as one level of authentication. In an implementation, after selecting an image when authenticating, the user 185 provides a gesture over the image. The image and the gesture provided by the user 185 are compared to the previously stored image and gesture of the user 185, and if they match (e.g., within a certain level of confidence), then the user 185 may be considered authenticated and access may be granted to the account(s) associated with the financial card 199. The images may be compared separately from the gestures, or the image and gesture combination received from the user 185 while authenticating may be compared to a previously stored image and gesture combination, depending on the implementation. Gestures and images in combination are further described with respect to FIG. 4, for example.

The gesture module 124 and the image module 126 may provide information to the user 185 regarding how to register gestures and images. The user 185 may register the gestures and the images via the mobile device 200 or another computing device of the user 185, for example.

The financial card engine 121 has access to data, files, and documents pertaining to the user 185 as well as any other data, files, and documents that are currently stored by the institution system 105 as well as external data, files, and documents that may be useful in processing an application for the financial card 199, issuing the financial card 199 to the user 185, and registering one or more gestures and/or images for the financial card 199. Data pertaining to the user 185 and/or the user account(s) may be retrieved from internal data source(s) 139 and/or external data source(s) 141. The retrieved data may be stored centrally, perhaps in storage 108. Information may also be provided to the institution system 105 from the user 185.

Internal data source(s) 139 may contain data, metadata, email, files, and/or documents that the institution system 105 maintains pertaining to the user 185, such as personal data such as name, physical address, email address, etc., as well as other account information. The institution system 105 may access this information when registering gestures or images or retrieving gestures and images for authentication of the user 185, for example.

A user access system may be communicatively coupled to the financial card engine 121 and may be configured to send machine-readable instructions to the financial card engine 121. As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to financial card data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein. An example computing device and its components are described in more detail with respect to FIG. 8.

Examples of software modules 109 may include modules that may be used in conjunction with receiving and processing an application for the financial card 199 for the user 185, issuing the financial card 199 to the user 185, requesting and receiving gestures and image selection from the user 185 to associate with the financial card 199, generating web page content for display, and receiving instructions from the user 185, for example. While specific functionality is described herein as occurring with respect to specific modules, the functionality may likewise be performed by more, fewer, or other modules.

FIG. 2 is a diagram of an example gesture 220 that may be useful in describing an implementation of providing user authentication via a mobile device 200. FIG. 2 shows a touchscreen 210 on the mobile device 200. The user 185 may provide a gesture 220 on a predetermined portion of the touchscreen 210. The predetermined portion of the touchscreen 210 where the user 185 may provide the gesture 220 is referred to as a signature area 230. The gesture 220 may be a check mark, an "X", or any other symbol or marking provided by the user.

During registration of the gesture 220, the institution system 105 may provide the signature area 230 for display on the touchscreen 210 of the mobile device 200. The user 185 may provide the gesture 220 using a finger or a stylus, for example, in the signature area 230.

The gesture 220 may be transmitted to the institution system 105 (by the user 185 pressing the send 280 button or an equivalent, for example). The institution system 105 may store the gesture 220 in storage, such as in a database record associated with the user 185 or the financial card 199, for example. The gesture 220 may be stored in a user's security profile made during registration. Gestures provide many more variations than numeric digits (e.g., such as those used in PINs).

Figure 5:
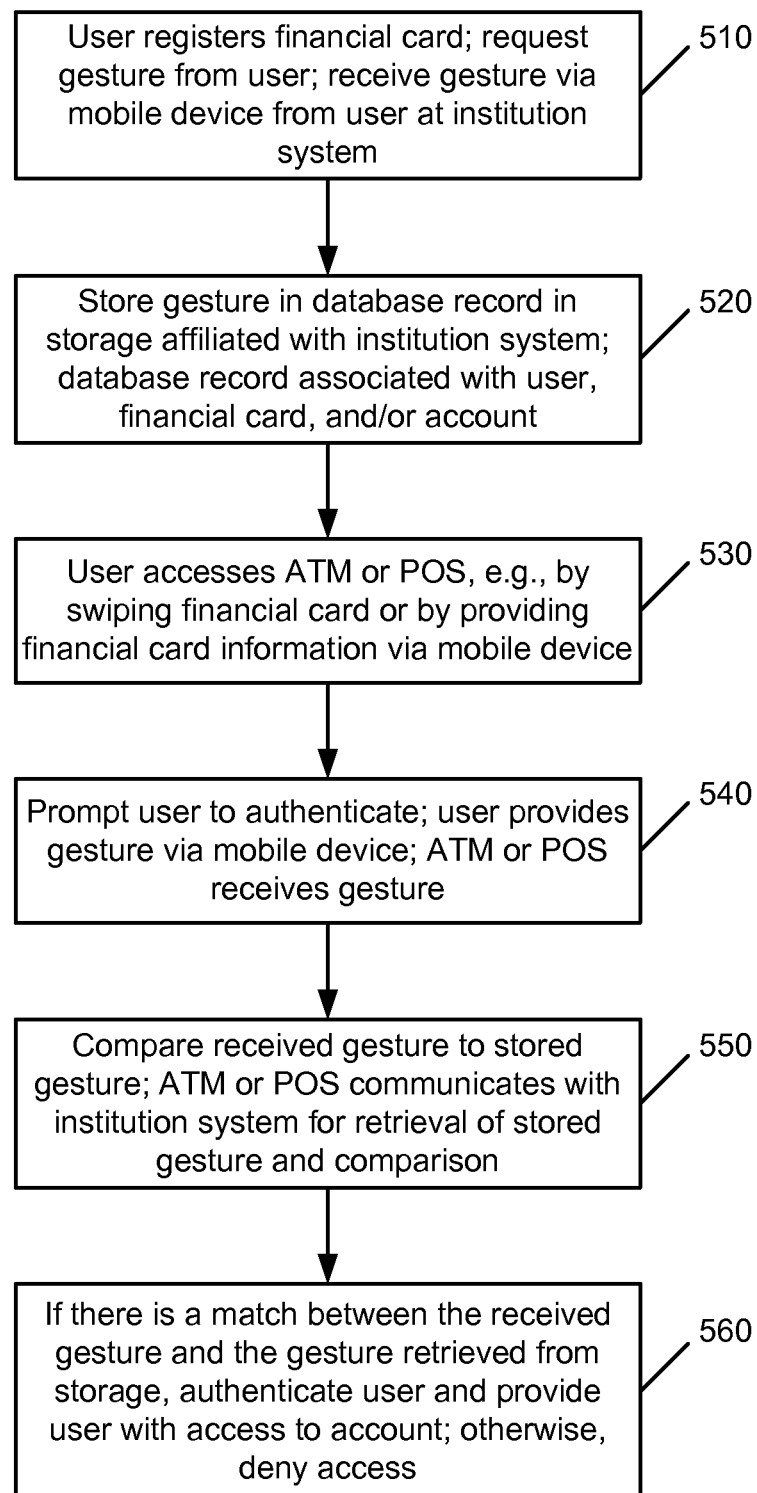
FIG. 5 is an operational flow of an implementation of a method that may be used to provide user authentication via a mobile device.

At some point, as described further with respect to the method 500 of FIG. 5, for example, the user 185 may provide the gesture 220 onto the signature area 230 of the mobile device 200 pursuant to a request from the ATM/POS or the institution system 105. The provided gesture 220 may be compared to a stored gesture in order to authenticate the user 185, if there is a match that meets at least a predetermined level of confidence. Gesture comparison between a received gesture and a stored gesture (i.e., a gesture retrieved from storage) can be conducted with known image processing and comparison techniques.

FIG. 3 is a diagram of an example of images 225 that may be useful in describing an implementation of providing user authentication via a mobile device 200. As with FIG. 2, FIG. 3 shows a touchscreen 210 on the mobile device 200. During registration, the institution system 105 may present multiple images 225 (shown in FIG. 3 as various shapes) to the user 185 on a display of a computing device of the user 185, such as the mobile device 200 or another computing device. The user 185 may select one of the images 225 (e.g., the diamond shape) as the image to be associated with the financial card 199 or a particular type of transaction involving the financial card 199, for example. The institution system 105 may receive the selected image (e.g., pursuant to the user selecting the send 280 button or an equivalent) and store the selected image in storage, such as in a database record associated with the user 185 or the financial card 199, for example.

Figure 4:
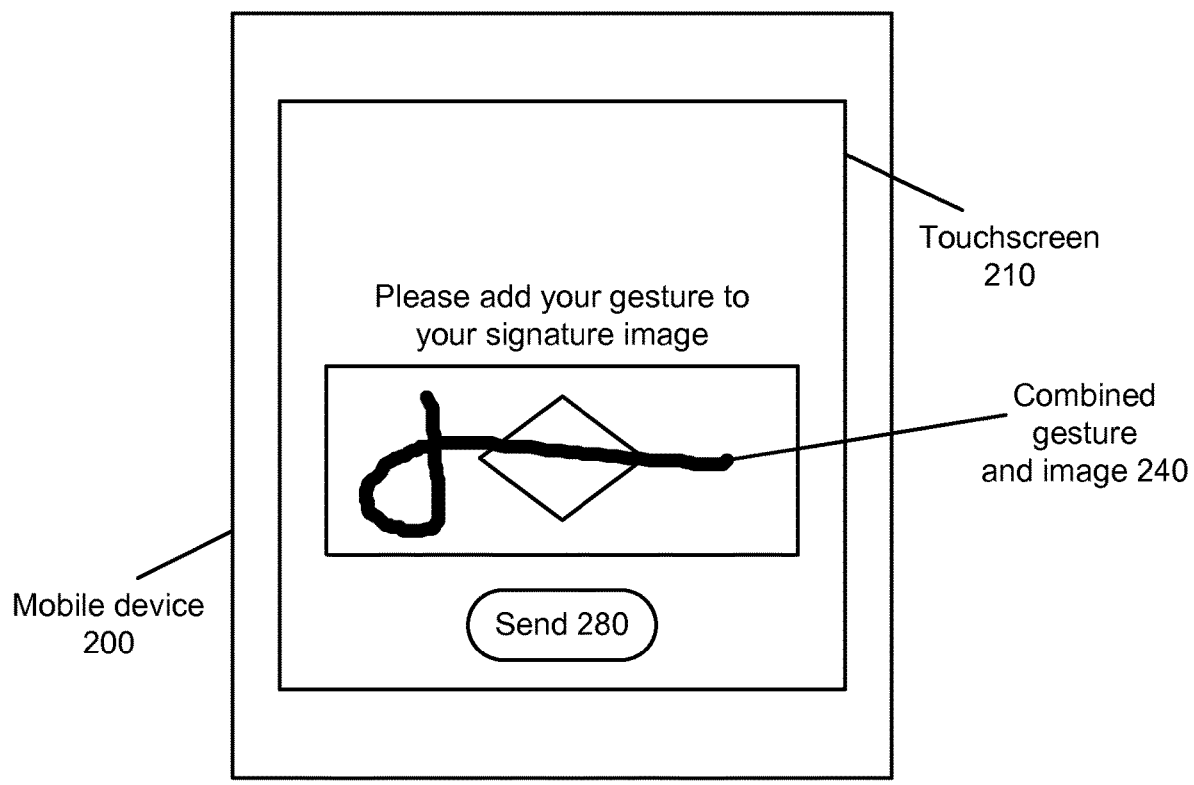
FIG. 4 is a diagram of an example of a gesture and an image that may be useful in describing an implementation of providing user authentication via a mobile device.

FIG. 4 is a diagram of an example of a gesture and an image that may be useful in describing an implementation of providing user authentication via a mobile device, such as the mobile device 200. At some point, as described further with respect to the method 600 of FIG. 6, for example, the user 185 may provide the image onto the signature area 230 of the mobile device 200 pursuant to a request from the ATM/POS or the institution system 105. The provided image may be compared to a stored image in order to authenticate the user 185 if the images match, and if a provided gesture matches a previously stored gesture. Image comparison can be conducted with known image processing and comparison techniques.

In an implementation, the user 185 may select an image from a plurality of images presented on the display of the mobile device 200 and may provide a gesture over the image in the signature area 230. The combined gesture and image 240 may be transmitted to the ATM/POS and then to the institution system 105 for comparison with a gesture and image that the user 185 had previously registered for the financial card 199. In this manner, the mobile device 200 may be used as an authentication mechanism for the ATM/POS.

FIG. 5 is an operational flow of an implementation of a method 500 that may be used to provide user authentication via a mobile device, such as the mobile device 200. At 510, a user may register a financial card with an institution system (e.g., the user 185 may register the financial card 199 with the institution system 105). The user may access a website of the institution system using a computing device, in an implementation, and receive a request for a gesture to associate with the financial card. The user may use a finger, stylus, mouse, or any input device to provide a gesture, e.g., via a touchscreen of the computing device. The gesture may be received at the institution system and, at 520, stored in storage affiliated with the institution system, such as in a database record or entry associated with the user, the financial card, and/or an account of the user.

At some point, at 530, the user may access an ATM or POS (referred to herein as ATM/POS) to perform a transaction, such as withdrawing money from an account tied to the financial card or making a purchase from an account tied to the financial card. In an implementation, the user may provide information (e.g., a user name, a card number, an expiration date, etc.) from the financial card to the ATM/POS by swiping the financial card through a card reader of the ATM/POS. Alternatively or additionally, the user may provide information from the financial card to the ATM/POS via their mobile device. Such information may have been previously stored by the user in the mobile device and may be uploaded to the ATM/POS over an appropriate communications channel. In this manner, the ATM/POS may obtain the identity of the user, yet the user is still to be authenticated.

At 540, the user may be prompted to authenticate. The user may receive a request to authenticate on the mobile device from the ATM or POS over an appropriate communications channel. The user may provide a gesture in response to the request. The gesture may be input by the user on the touchscreen of the mobile device, in an implementation, and may be transmitted to the ATM/POS where it is received.

The transmission between the mobile device and the ATM/POS could be over any suitable near field communications network, such as via a mobile cell channel, optically (optical transmission), via Bluetooth, or via RFID, for example. Transmissions between the ATM/POS and the mobile device may be encrypted to further enhance security. Any known encryption technique(s) may be used.

In an implementation, at 550, the received gesture may be compared to the stored gesture (e.g., stored during the registration at 520). The ATM/POS may communicate with the institution system for retrieval of the stored gesture. The ATM/POS or the institution system may perform the comparison between the two gestures, using any known image processing and comparison technique(s), for example.

If there is a match between the received gesture and the stored gesture, at least with a certain predetermined level of confidence (e.g., over 95%, at least 98%, etc.), then it may be determined that the user is authenticated at 560 and the user may be provided with access to the account (e.g., to withdraw money, to make a purchase, etc.). In an implementation, the user may provide further instructions to the ATM/POS through the mobile device, such as indicating how much money they would like to withdraw from the ATM or an account they would like to transfer funds to. If there is no match between the received gesture and the stored gesture, then the user is not authenticated and is denied access to the account, in an implementation.

Figure 6:
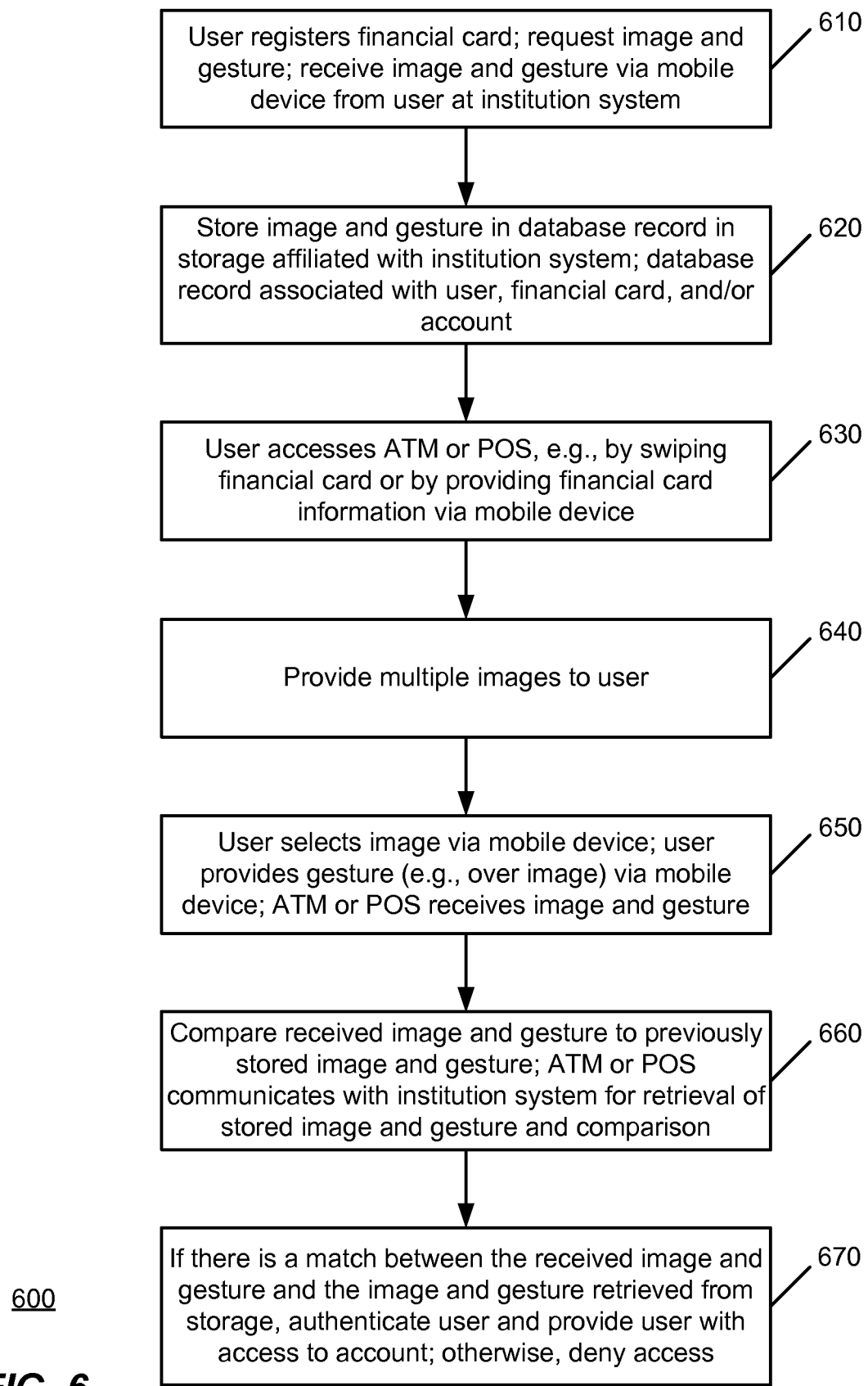
FIG. 6 is an operational flow of another implementation of a method that may be used to provide user authentication via a mobile device.

FIG. 6 is an operational flow of another implementation of a method 600 that may be used to provide user authentication via a mobile device, such as the mobile device 200. At 610, a user may register a financial card with an institution system e.g., by accessing a website of the institution system using a computing device, such as a mobile device in an implementation, and receiving a request for a gesture and an image to associate with the financial card. The user may use a finger, stylus, mouse, or any input device to provide a gesture and select an image on a display of the computing device and/or via a touchscreen of the computing device, for example. In an implementation, the user may be presented with a plurality of images and may select one of the images using any known selection technique(s) (e.g., clicking, highlighting, etc.).

The gesture and image may be received at the institution system and, at 620, stored in storage affiliated with the institution system, such as in a database record or entry associated with the user, the financial card, and/or an account of the user. The gesture and the image may be stored separately from each other or may be stored as a combined image. In an implementation, the combined image may be formed by superimposing the gesture on the image, resulting in the combined image.

At some point, at 630, the user may access an ATM/POS to perform a transaction. Operation 630 is similar to 530 and its further description is omitted for brevity. At this point, the user is still to be authenticated. At 640, multiple images may be transmitted to the mobile device from the ATM/POS or the institution system and provided to the user via the display of the mobile device.

At 650, the user may select one of the images via the mobile device and, in an implementation, may be presented with the image in a signature area on a display of the mobile device, such as the signature area 230. The user may provide a gesture in the signature area (e.g., over the image) using their finger, stylus, or other input device. The image and gesture may be transmitted from the mobile device to the ATM/POS where they are received. The image and gesture may be combined at the mobile device prior to transmission or at the ATM/POS after being received. In an implementation, the image and gesture may remain separate and may not be combined.

The image and gesture may be used to authenticate the identity of the user. At 660, the image and gesture that have been received from the mobile device are compared with the image and gesture that have been previously stored (e.g., at 620) as corresponding to the user. The comparisons may be performed separately (e.g., the images are compared and the gestures are compared) or as a combination (e.g., the image and gesture received are combined and this combination is compared with an image and gesture combination formed from the previously stored image and gesture). The ATM/POS may communicate with the institution system in the performance of the comparison(s), e.g., to obtain the image and gesture from storage of the institution system for comparison and/or to provide the received image and gesture to the institution system for comparison by the institution system.

If the user has selected the correct image and provided the proper gesture, as determined by the comparison, the user may be authenticated at 670 and provided with access to the account associated with the financial card. Otherwise, the user may be advised that the authentication was not successful and may be denied access to the account.

Figure 7:
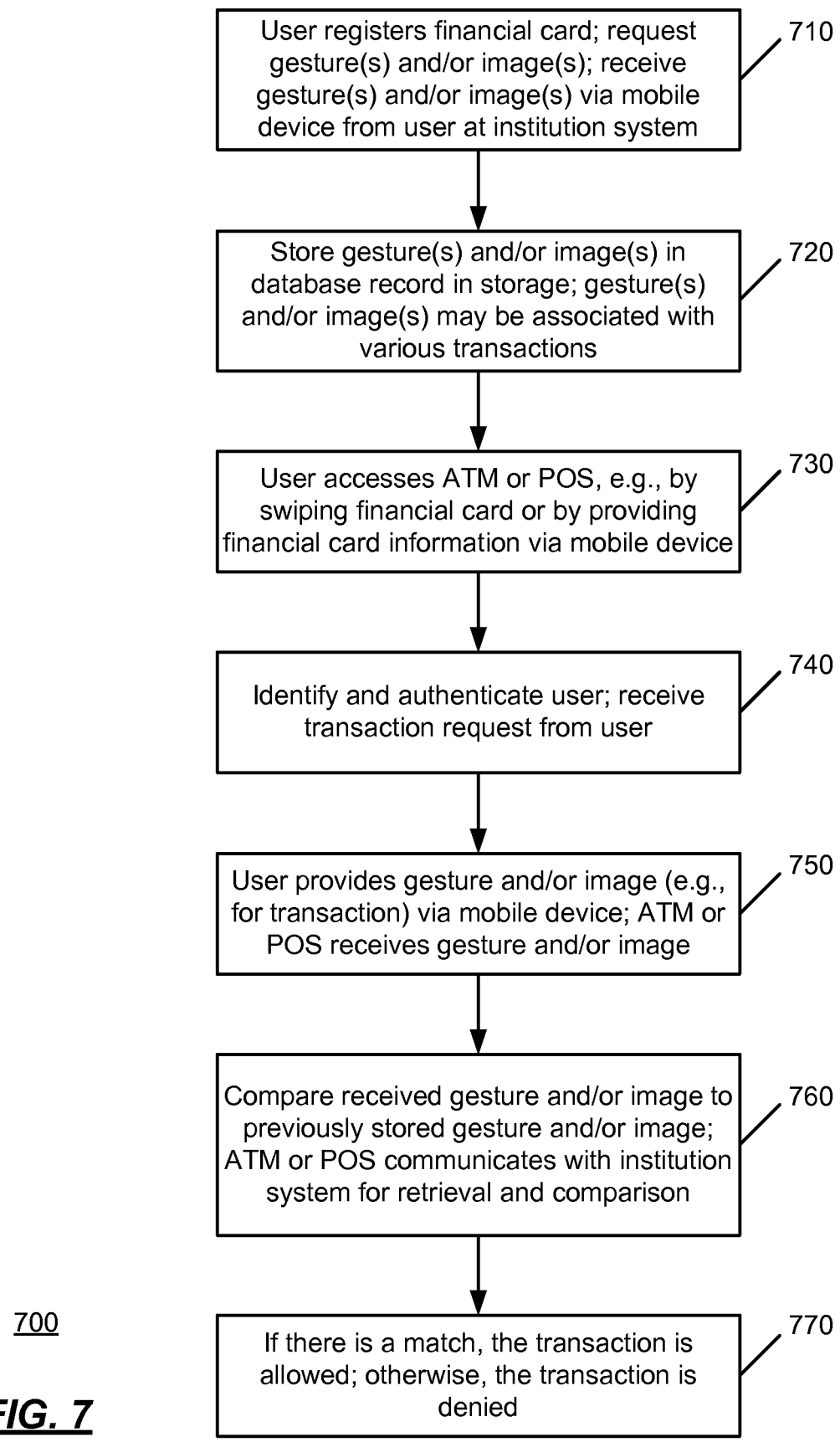
FIG. 7 is an operational flow of another implementation of a method that may be used to provide user authentication via a mobile device.

FIG. 7 is an operational flow of another implementation of a method 700 that may be used to provide user authentication via a mobile device. At 710, a user may register a financial card with an institution system e.g., by accessing a website of the institution system using a computing device, such as a mobile device in an implementation, and receiving a request for a gesture and/or an image to associate with the financial card, similar to the techniques described with respect to the methods 500 and 600, for example. The gesture and/or image may be received at the institution system and, at 720, may be stored in storage affiliated with the institution system. In an implementation, if both a gesture and image are received (as in the technique of the method 600), the gesture and the image may be stored separately from each other or may be stored as a combined image.

At some point, at 730, the user may access an ATM/POS to perform a transaction. Operation 730 is similar to 530 and its further description is omitted for brevity. The user may be authenticated at 740 using techniques described herein or any known technique(s) for authentication, such as receiving and analyzing one or more pieces of identification of the user 185, such as a PIN, a driver's license, other financial cards issued to the user 185, and/or biometrics of the user 185 such as fingerprints, eye retinas and irises, voice patterns, facial patterns, and hand measurements. The ATM/POS may perform the identification and authentication alone or in conjunction with the institution system. The ATM/POS may communicate over a communications network with the institution system to perform the identification and authentication processing. After being identified and authenticated, the user may transmit a request for a transaction to the ATM/POS where it is received. The transaction request may be provided by the mobile device of the user or by an input device (e.g., keypad, touchscreen, etc.) of the ATM/POS.

A gesture, alone (e.g., as in the method 500) or in conjunction with an image (e.g., as in the method 600) depending on an implementation, may be used to further authenticate the user with respect to the particular transaction. The gesture and/or image may be requested of the by the ATM/POS and provided by the user via the mobile device at 750.

The ATM/POS may receive the gesture and/or image and, at 760, may perform a comparison between the received gesture and/or image and the previously stored gesture and/or image (e.g., from 720). One or more comparisons may be performed using techniques similar those described at 550 and 660, depending on an implementation. At 770, if the comparison results in a match, then the transaction is allowed; otherwise, the transaction may be denied as the authentication cannot be verified.

In an implementation, different gestures and/or images may be registered (e.g., at 710) to authenticate the user for different types of transactions, to access different accounts tied to the same financial card, or to confirm different amounts of money being transacted. For example, a first gesture may be registered to authenticate the user for a cash withdrawal from an ATM, a second gesture may be registered to authenticate the user for a purchase at a POS, and a third gesture may be registered to authenticate the user for a transfer of funds via an ATM. In this manner, the user provides the appropriate gesture via the mobile device (e.g., at 750) depending on the type of transaction that is requested (e.g., at 740). A correct gesture (e.g., as determined at 760) confirms the transaction and allows the transaction. If an incorrect gesture is provided by the user, the transaction may be denied.

Similarly, various images may be registered for use with authenticating the user for various types of transactions, accounts, or amounts of transactions. The various images may be registered with a single gesture (the same gesture) for each image or with various gestures corresponding to the various images.

In an implementation, a first gesture (and/or image) may be registered to authenticate the user in a transaction involving an amount less than a predetermined amount, and a second gesture (and/or image) may be registered to authenticate the user in a transaction involving an amount of at least the predetermined amount. In this manner, depending on the amount of money involved in the requested transaction, the user provides the appropriate gesture (and/or image) (e.g., at 750) in order to authenticate and confirm the transaction.

In an implementation, a first gesture (and/or image) may be registered to authenticate the user to provide the user with access to a first account associated with the financial card (such as a checking account, for example), and a second gesture (and/or image) may be registered to authenticate the user to provide the user with access to a second account associated with the financial card (such as a savings account, for example). In this manner, depending on the account sought to be accessed by the user, the user provides the appropriate gesture (and/or image) in order to authenticate and access that account.

Although the examples described herein may be directed to financial cards issued by the institution 102 affiliated with the institution system 105, the techniques may be used with respect to any financial cards, such as financial cards issued by a third party or an entity that is separate from the institution system 105 or unaffiliated with the institution system 105.

Figure 8:
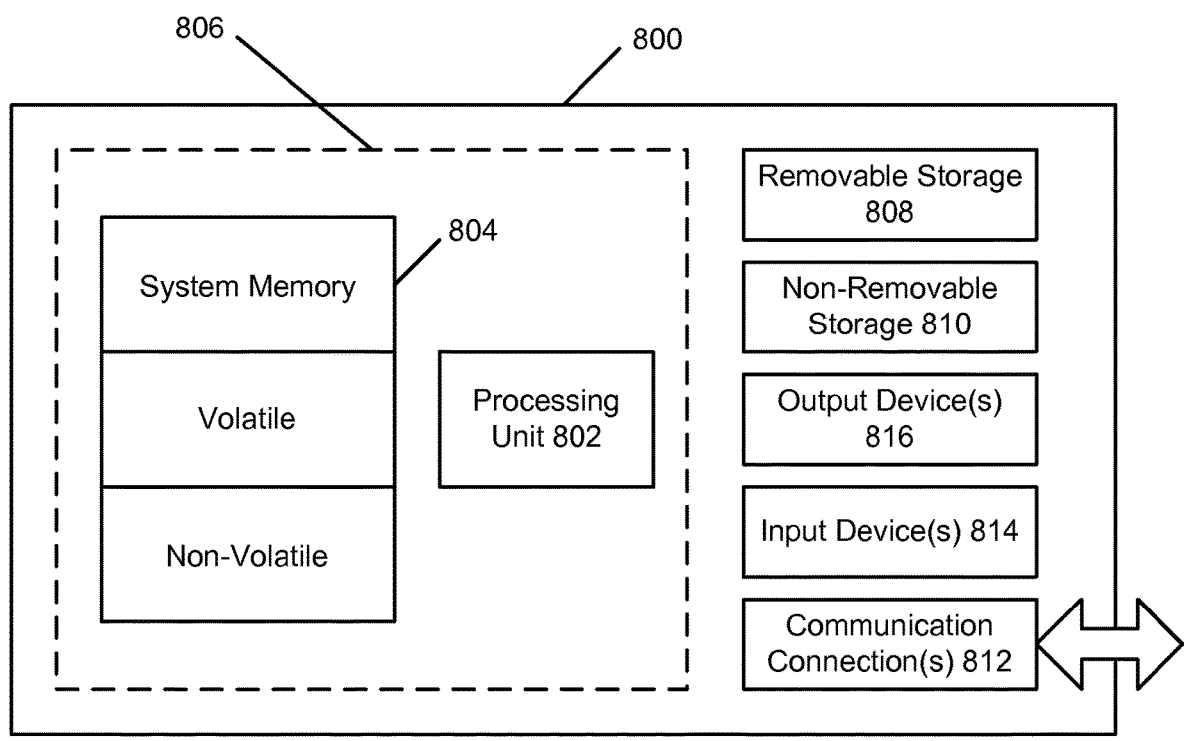
FIG. 8 is a block diagram of an example computing environment in which example embodiments and aspects may be implemented.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and system memory 804. Depending on the exact configuration and type of computing device, system memory 804 may be volatile (such as RAM), non-volatile (such as read-only memory (ROM), flash memory, etc.), or some combination of the two. This most basic configuration is illustrated in FIG. 8 by dashed line 806.

Computing device 800 may have additional features and/or functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer-readable media. Computer-readable media can be any available media that can be accessed by computing device 800 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 804, removable storage 808, and non-removable storage 810 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may also contain communication connection(s) 812 that allow the computing device 800 to communicate with other devices. Communication connection(s) 812 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

Computing device 800 may be one of a plurality of computing devices 800 inter-connected by a network. As may be appreciated, the network may be any appropriate network, each computing device 800 may be connected thereto by way of communication connection(s) 812 in any appropriate manner, and each computing device 800 may communicate with one or more of the other computing devices 800 in the network in any appropriate manner. For example, the network may be a wired or wireless network within an organization or home or the like, and may include a direct or indirect coupling to an external network such as the Internet or the like.

Figure 9:
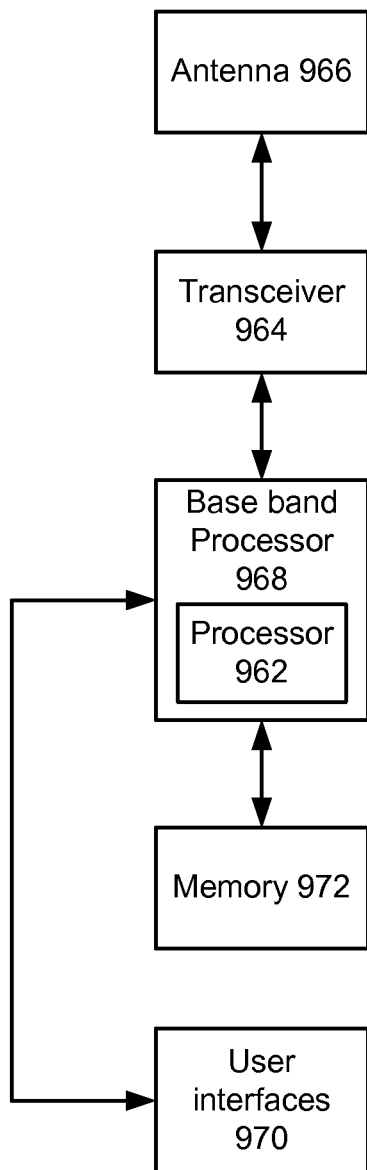
FIG. 9 is a block diagram of a possible configuration of a mobile device.

FIG. 9 is a block diagram of a possible configuration of a mobile device 900, such as the mobile device 200. As those skilled in the art will appreciate, the precise configuration of the mobile device 900 may vary depending on the specific application and the overall design constraints. Processor 962 can implement systems and methods disclosed herein.

Mobile device 900 can be implemented with a front-end transceiver 964 coupled to an antenna 966. The front-end transceiver 964 is configured to receive a data communication. A base band processor 968 can be coupled to the transceiver 964. The base band processor 968 can be implemented with a software-based architecture, or other types of architecture. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Mobile device 900 can also include various user interfaces 970 coupled to the base band processor 968. User interfaces 970 can include a keypad, mouse, touchscreen, display, ringer, vibrator, audio speaker, microphone, camera, and/or other input/output devices.

The base band processor 968 comprises a processor 962. In a software-based implementation of the base band processor 968, the processor may be a software program running on a microprocessor. However, as those skilled in the art will readily appreciate, the processor 962 is not limited to this embodiment, and may be implemented by a variety of means known in the art, including hardware configurations, software configurations, or combination thereof, which is capable of performing the various functions described herein. The processor 962 can be coupled to memory 972 for the storage of data. The memory 972 is configured to store the program data received during a manufacturing and/or test process and the processor 962 or 968 is configured to be programmed with the program data.

It is to be understood that embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

The disclosed embodiments may be applied to any one or combinations of the following technologies: CDMA systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems, for example.

The steps of a method described in connection with embodiments disclosed herein may be embodied directly in hardware, in a software module executed by a processor, or in a combination of the two. A software module may reside in RAM, flash memory, ROM, EPROM, EEPROM, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an application specific integrated circuit (ASIC). The ASIC may reside in a user terminal. In the alternative, the processor and the storage medium may reside as discrete components in a user terminal.

It should be noted that the methods described herein may be implemented on a variety of hardware, processors, and systems known by one of ordinary skill in the art. For example, the general requirement for the mobile device to operate as described herein is that the mobile device has a display to display content and information, a processor to control the operation of the mobile device, and a memory for storing data and programs related to the operation of the mobile device. In some embodiments, the mobile device is a mobile phone. In some embodiments, the user computing device is a handheld computer having communications capabilities. In yet another embodiment, the mobile device is a smart phone or PDA having communications capabilities.

The various illustrative logics, logical blocks, modules, and circuits described in connection with the embodiments disclosed herein may be implemented or performed with a general purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium comprising computer-readable instructions for user authentication, said computer-readable instructions comprising instructions executable by an Automatic Teller Machine (ATM) to cause the ATM to interact with a mobile device of a user to perform operations comprising:

receiving information of a financial card of the user;

transmitting user interface data to the mobile device of the user that, when received by the mobile device, causes the mobile device to display on a display device of the mobile device a prompt for the user to provide a first freeform input, the first freeform input comprising a first freeform gesture over a first image;

parsing image data generated on the mobile device representing the first freeform input;

determining that the first freeform input matches a second freeform input of the user based on data representing the second freeform input, the data representing the second freeform input being previously stored in a data store, and the second freeform input comprising a second freeform gesture over a second image; and in response to a determination that the first freeform input matches the second freeform input, authenticating the user to access an account of the financial card.

2. The non-transitory computer-readable medium of claim 1, wherein the image data generated on the mobile device comprises encrypted image data, the operations further comprising decrypting the encrypted image data.

3. The non-transitory computer-readable medium of claim 1, the operations further comprising, prior to receiving the information of the financial card, receiving the data representing the second freeform input from the mobile device.

4. The non-transitory computer-readable medium of claim 1, wherein the data store comprises a data store of a system of a financial institution associated with the financial card.

5. The non-transitory computer-readable medium of claim 1, wherein the second freeform input comprises a written communication made with an input device on a touchscreen of the mobile device.

6. The non-transitory computer-readable medium of claim 1, wherein the financial card comprises one or more of: a credit card, a debit card, or an ATM card.

7. An Automatic Teller Machine (ATM) comprising:
at least one processor; and
memory resources coupled to the at least one processor and configured to direct the at least one processor to perform operations comprising:
receiving information of a financial card of a user;
transmitting user interface data to a mobile device of the user that, when received by the mobile device, causes the mobile device to display on a display device of the mobile device a prompt for the user to provide a first freeform input, the first freeform input comprising a first freeform gesture over a first image;
parsing image data generated on the mobile device representing the first freeform input;
determining that the first freeform input matches a second freeform input of the user based on data representing the second freeform input, the data representing the second freeform input being previously stored in a data store, and the second freeform input comprising a second freeform gesture over a second image; and
in response to a determination that the first freeform input matches the second freeform input, authenticating the user to access an account of the financial card.

8. The ATM of claim 7, wherein the image data generated on the mobile device comprises encrypted image data, the operations further comprising decrypting the encrypted image data.

9. The ATM of claim 7, the operations further comprising, prior to receiving the information of the financial card, receiving the data representing the second freeform input from the mobile device.

10. The ATM of claim 7, wherein the data store comprises a data store of a system of a financial institution associated with the financial card.

11. The ATM of claim 7, wherein the second freeform input comprises a written communication made with an input device on a touchscreen of the mobile device.

12. The ATM of claim 7, wherein the financial card comprises one or more of: a credit card, a debit card, or an ATM card.

13. The ATM of claim 7, wherein the display of the mobile device comprises a touchscreen display.

14. A method performed by an Automatic Teller Machine (ATM), comprising:
receiving information of a financial card of a user;
transmitting user interface data to a mobile device of the user that, when received by the mobile device, causes the mobile device to display on a display device of the mobile device a prompt for the user to provide a first freeform input, the first freeform input comprising a first freeform gesture over a first image;
parsing image data generated on the mobile device representing the first freeform input;
determining that the first freeform input matches a second freeform input of the user based on data representing the second freeform input, the data representing the second freeform input being previously stored in a data store, and the second freeform input comprising a second freeform gesture over a second image; and
in response to a determination that the first freeform input matches the second freeform input, authenticating the user to access an account of the financial card.

15. The method of claim 14, wherein the image data generated on the mobile device comprises encrypted image data, the method further comprising decrypting the encrypted image data.

16. The method of claim 14, further comprising, prior to receiving the information of the financial card, receiving the data representing the second freeform input from the mobile device.

17. The method of claim 14, wherein the second freeform input comprises a written communication made with an input device on a touchscreen of the mobile device.

18. A non-transitory computer-readable medium comprising computer-readable instructions for user authentication, said computer-readable instructions comprising instructions executable by an Automatic Teller Machine (ATM) to cause the ATM to interact with a mobile device of a user to perform operations comprising:
receiving information of a financial card of the user;
transmitting user interface data to the mobile device of the user that, when received by the mobile device, causes the mobile device to display on a display device of the mobile device a prompt for the user to provide a first freeform input;
parsing image data generated on the mobile device representing the first freeform input, wherein the image data generated on the mobile device comprises encrypted image data;
decrypting the encrypted image data;
determining that the first freeform input matches a second freeform input of the user based on data representing the second freeform input, the data representing the second freeform input being previously stored in a data store; and
in response to a determination that the first freeform input matches the second freeform input, authenticating the user to access an account of the financial card.

19. An Automatic Teller Machine (ATM) comprising:
at least one processor; and
memory resources coupled to the at least one processor and configured to direct the at least one processor to perform operations comprising:
receiving information of a financial card of a user;
transmitting user interface data to a mobile device of the user that, when received by the mobile device, causes the mobile device to display on a display device of the mobile device a prompt for the user to provide a first freeform input;

parsing image data generated on the mobile device representing the first freeform input, wherein the image data generated on the mobile device comprises encrypted image data;

decrypting the encrypted image data;

determining that the first freeform input matches a second freeform input of the user based on data representing the second freeform input, the data representing the second freeform input being previously stored in a data store; and in response to a determination that the first freeform input matches the second freeform input, authenticating the user to access an account of the financial card.

20. A method performed by an Automatic Teller Machine (ATM), comprising:

receiving information of a financial card of a user;

transmitting user interface data to a mobile device of the user that, when received by the mobile device, causes the mobile device to display on a display device of the mobile device a prompt for the user to provide a first freeform input;

parsing image data generated on the mobile device representing the first freeform input, wherein the image data generated on the mobile device comprises encrypted image data;

decrypting the encrypted image data;

determining that the first freeform input matches a second freeform input of the user based on data representing the second freeform input, the data representing the second freeform input being previously stored in a data store; and in response to a determination that the first freeform input matches the second freeform input, authenticating the user to access an account of the financial card.

* * * * *